Sept. 12, 1967 K. C. HOEGLUND 3,341,004
INTERLINED TAPES IN ROLL FORM
Filed Dec. 16, 1965
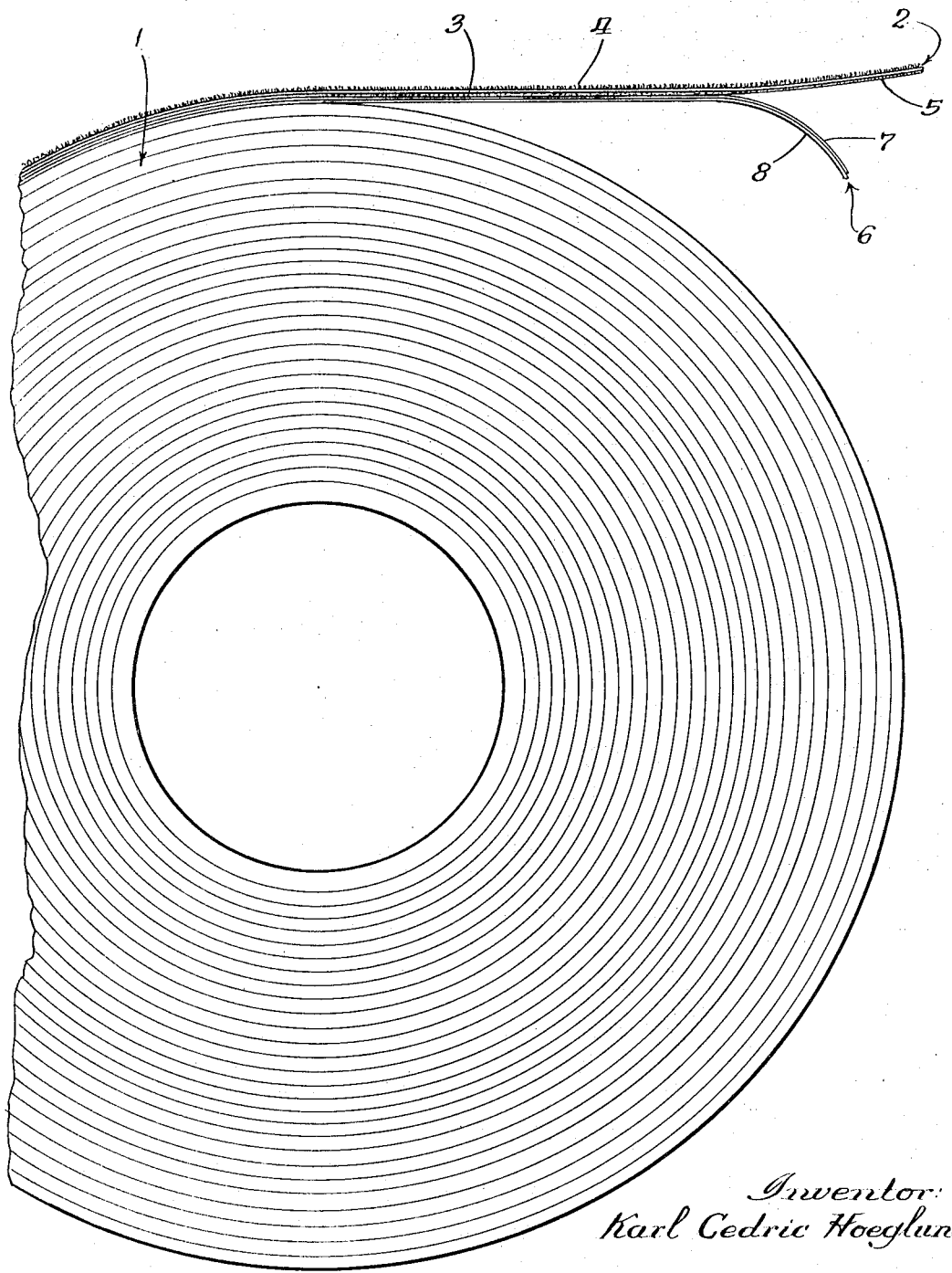
Inventor:
Karl Cedric Hoeglund

3,341,004
INTERLINED TAPES IN ROLL FORM
Karl Cedric Hoeglund, Franklin, Ky., assignor to The Kendall Company, Boston, Mass., a corporation of Massachusetts
Filed Dec. 16, 1965, Ser. No. 514,278
12 Claims. (Cl. 206—59)

This invention relates to normally tacky pressure-sensitive adhesive tape wound in roll form. This invention in particular relates to normally tacky pressure-sensitive adhesive tape wound in stable roll form with an interliner separating each tape convolution in the roll.

At some stage in the manufacture of pressure-sensitive adhesive tape it is customary to wind the tape into a roll, either at an early manufacturing stage for temporarily storing the tape or at the stage of preparing it in a form ready for use by the ultimate user thereof. In many instances the tapes may be wound directly on itself to form a roll in which the adhesive surface of the tape is in direct contact with the backside of an adjacent convolution of the tape. Well known examples of such rolls of tapes are hospital and industrial cloth-backed and plastic film backed tapes. The backside of fabrics and even of smooth plastic films in some instances have to be specially treated in order to take advantage of the compact storage and convenience of use features of rolls of tape.

Other tapes, because of blocking or deleterious effect the adhesive or backing may have on the other either by reason of chemical composition or physical structure, cannot be wound in satisfactory roll form with the adhesive surface directly against the backside of an adjacent convolution of the tape. In these instances, the tapes are wound with an interliner between adjacent convolutions of the tape to separate the adhesive surface from the backside of the tape. Tapes made with backings having a fuzzy or nappy backside, such as flannel and felt, are examples of tapes which require the use of an interliner. The interliner prevents blocking in the cases where the adhesive and fibrous backside are such that the fibrous components thereof become so firmly embedded in the adhesive layer of an adjacent convolution that the tape cannot be unwound for all practical purposes. The interliner protects the surface of the pressure-sensitive adhesive layer from contamination by the fuzzy or nap fibers which may pull away from the backside of the tape when it is unwound from a roll.

With the emphasis upon adhesive protection the interliner materials customarily employed have been the same as those serving as facings for adhesives, such as paper or film easily strippable from the adhesive surface and, of course, inert to the adhesive. The interliner has no adherence to the backside of the tape and is unwound from the roll adhered to the adhesive surface of the tape.

Rolls of tape made with the conventional interliners are inherently unstable. The tape convolutions may move laterally with respect to each other and collapse in a telescoping fashion. The interlined rolls of tapes must be handled carefully to prevent accidental unwinding. The instability of the rolls increases with the narrower tapes and the larger diameter rolls of tape.

The problem of instability is quite acute in the case of flannel and felt tapes in roll form and interlined with prior art interliners of flat or creped papers and smooth or embossed films. The problem is so acute in the case of tapes cut into narrow widths, less than about ½″ in width where only a slight lateral movement of the layers of faced tape will cause the roll to collapse, that larger width tapes have been employed even though a narrower width tape is all that is required. If the space restrictions are such that a narrow width tape must be used if tape is to be used at all, a substitute material is frequently selected because of the higher cost of storing and handling narrow width tapes and the waste encountered in their application.

Accidentally unwinding of the tape is another drawback of the prior art interlined rolls of tape. In assembly-line tape applications, for example, lengths of tape may be rapidly and intermittently drawn from a freely rotating tape roll. The tape may continue to unwind from a spinning roll after the length of tape is severed therefrom. Depending upon the flexibility or conformability of the tape, the tape may tend to unravel from the roll while the roll itself is at rest. Further, accidental unwinding may occur when the outermost convolution of the tape slips laterally from the roll and in hanging along the side of the roll causes successive convolutions to slip and fall from the roll.

It is an object of this invention to provide interlined rolls of tape free from the foregoing deficiencies and limitations of prior art interlined tape rolls in the manufacture and use thereof. An object of this invention is to make practical the manufacture and use of tapes requiring an interliner for separation of the adhesive surfaces and backsides of adjacent convolutions of the tape in roll form. Included among the objects of this invention are: rolls of interlined tape stable against forces acting thereon to cause collapse of the roll; rolls of interlined tape which do not accidentally unwind; and rolls of tape with an interliner that protects the adhesive surface of the tape and does not deleteriously affect the backing with which it is in contact. These and other objects will be apparent from the following description of the invention.

In accordance with this invention, the convolutions of the pressure-sensitive adhesive tape in the roll are separated from each other by an interliner, one surface of which is releasably adhered to and covers the adhesive surface of the tape and the opposite surface of which is in temporary positive engagement with the backside of an adjacent convolution of tape. The problems and restrictions long associated with rolls of tape wound with an interliner are overcome in accordance with this invention by means of the use of an interliner which positively engages the backside of the tape. Interliner materials of this invention, heretofore unknown for use as an interliner, have been readily available to, indeed literally at the finger-tips of, those skilled in the art ever since interliners have been required. The interliner materials may be pressure-sensitive adhesive tapes. The adhesive coating of the interliner tape is such as to adhere to the backside of the adjacent tape convolution only enough to restrain the tape convolutions from lateral movement, but insufficient to block with the tape or impair the backside of the tape when stripped therefrom. Tapes found suitable for use as an interliner for flannel and felt pressure-sensitive adhesive tapes are paper and film backed tapes having a thin, for example, no greater than about 2 mils thick, coating of a conventional rubber-resin pressure-sensitive adhesive.

The drawing is a plan view of a section of a roll 1 of an interlined tape 2 of this invention wherein the backing 3 is a 60/38 flannel cloth approximately 23 mils thick (ASTM-D-1000) and ¼″ wide. The numeral 4 designates the nap at the backside of the tape. The numeral 5 designates the pressure-sensitive adhesive layer on one side of the flannel cloth backing 3 for a total tape thickness of about 26–27 mils. The backing may be coated with the adhesive by any of the methods known for coating cloth with adhesive. The pressure-sensitive adhesive layer 5 is a rubber-resin pressure-sensitive adhesive comprising, on a weight basis, about 45 parts of a mixture of reclaim rubber and smoked sheet, about 20 parts of rosin derivative tackifier resins, about 25 parts of a zinc oxide and Dixie clay filler, and a minor amount of mineral oil and antioxidant.

The interliner 6 is a smooth polyethylene film 7 coated on one side thereof with a pressure-sensitive adhesive layer 8 about 1 mil in thickness. The layer also is a rubber-resin pressure-sensitive adhesive comprising about 100 parts rubber, 88 parts tackifier resin, 15 parts filler and minor amounts of mineral oil and antioxidants. The flannel tape 2 is wound convolutely upon itself to form the roll 1 with the adhesive layer 5 of the flannel tape covered by and in contact with the uncoated side of the polyethylene film 7 of the tape interliner 6 and the adhesive layer 8 in adherent contact with the nap 4 at the backside of the flannel tape. As shown in the drawing, a portion of the tape is unwound from the roll and the interliner is in the process of being removed from the flannel tape 2.

The degree of adhesion of the adhesive layer 5 of the flannel tape to the smooth surface of the film 7 of the interliner is greater than the adhesion of adhesive layer 8 of the interliner to the nap 4 of the underlying convolution of the flannel tape in the roll. The adhesion of the adhesive layer 5 to the smooth surface of the film 7 in the case of this example was 25.6 ozs. per inch width of tape as measured by stripping the flannel tape from the film side of the interliner at a peel angle of 180°. The force necessary to unwind the flannel tape with the interliner attached to the adhesive surface thereof was 14.9 ozs. per inch width. Upon unwinding the flannel tape from the roll in the normal fashion, the tape interliner remains adhered to the adhesive surface 5 and disengages from the backside of the underlying convolutions of the tape. The nap 4 becomes raised as the adhesive layer 8 separates from adhesive engagement therewith. Some of the nap fibers transfer to the adhesive layer, but not in sufficient quantity to impair the flannel tape for its intended use, such as a cushioning tape, anti-mar tape, sound deadening tape, and the like.

The tape with the interliner was wound on a 3" diameter core to form a roll about 9" in diameter. The ¼" wide roll of tape was very stable under even exaggeratedly rough handling conditions. The roll was dropped or thrown from heights of several feet to land on the floor at various angles of impact without causing the roll to collapse or the tape to unwind. The roll can be substantially deformed into a saucer-like shape and then pressed back into its normal flat shape. Accordingly, the convolutions can be moved laterally with respect to each other without destroying the roll as long as there is some overlapping of contiguous convolutions in the roll.

Rolls of the flannel tape were also prepared using a flat backed paper adhesive tape as the interliner instead of the film tape interliner previously described. This paper tape interliner had a silicone coating on one side and a thin solvent spread adhesive on the other side. The adhesive of the flannel tape's adhesive layer to the silicone coated surface of the paper was 1.1 oz. per inch width. The unwind force necessary to separate the paper tape interliner from the backside of the flannel tape was 13.6 ozs. per inch width.

It is critical for the purpose of this invention that the adherence between the interliner and the backside of the tape be less than the adherence of the adhesive surface of the tape to the backside of the tape if wound in roll form without an interliner. Where the tape to be interlined in the roll is a tape having a loose texture of fibers on the backside thereof, such as in the case of flannel and felt cloth tapes, the adhesive coating on the interliner must be such that the adhesive layer will not emerge with the fibers when in contact therewith in the roll. Otherwise the result will be the same as when the napped tape is wound upon itself. These requirements can be satisfied by proper formulations of pressure-sensitive adhesives for the interliner. It is within the skill of the art to formulate a "dead" adhesive as compared to relatively aggressive, tacky and high adhesion pressure-sensitive adhesives.

Tack, and adhesion that will develop under moderate roll winding pressures, may be reduced, for example, by incorporating a curing agent in appropriate rubber-resin or other pressure-sensitive adhesives. The thinness of the adhesive required on the interliner may vary with the firmness of the adhesive. The suitability of the interliner for the various tapes can easily be determined in advance by impressing the interliner tape adhesive surface upon the backside of the tape and then stripping the interliner tape therefrom to determine whether the removal of the interliner tape impairs the backside of the tape for its intended application.

While reference has been made to pressure-sensitive adhesive coatings on the interliner, it is to be understood that other adhesives may be employed, such as water, solvent or heat-activatable adhesives. The interliner adhesive coating need be neither coextensive with the width of the interliner nor a continuous coating over the entire surface of the interliner.

It is one of the advantages of this invention that the interlined tape may be unwound from the roll with the interliner adhered to the backside of the tape, rather than to the adhesive surface of the tape. This is not possible with tapes interwound with prior interliners. For this purpose, an interliner may be used with an adhesive coating having a degree of adherence to the backside of the interlined tape greater than the degree of adherence between the interlined tape's adhesive surface and the backside of the interliner. This may be accomplished by coating the backside with a release agent, such as a silicone resin having very low adherence to the adhesive surface. Upon unwinding the interlined tape from the roll, the interliner remains on the backside of the tape when the force necessary to separate the interliner adhesive surface from the backside of the tape. The interliner thus serves as a temporary protective cover over the backside of the tape.

Although this invention is of primary importance in providing a solution to problems and restrictions long imposed upon tapes having a loose texture of fibers on the backside thereof, it will be appreciated that interliners described herein may also be employed with other tapes which require an interliner when wound in roll form.

The invention claimed is:

1. A roll of pressure-sensitive adhesive tape in which adjacent convolutions of said tape are separated from each other by an interliner, said tape having a backside and on the side opposite thereto a pressure-sensitive adhesive front surface, said interliner having a back surface in contact with and separably adhered to the adhesive surface of said tape, the opposite surface of said interliner having adhesive thereon adhesively engaging the backside of said tape to restrain the tape convolutions from lateral movement with respect to each other and thereby prevent telescoping collapse of the roll and accidental unwinding of the tape therefrom, the adherence between said adhesive on the interliner and the backside of the tape being less than the adherence of the adhesive surface of the tape to the backside of the tape of an adjacent convolution if wound in roll form without said interliner.

2. A roll of pressure-sensitive adhesive tape in accordance with claim 1 wherein the force necessary to separate the interliner from the adhesive surface of said tape is greater than the force necessary to separate the interliner from the backside of said tape of an adjacent convolution thereof in unwinding the tape from said roll, whereby the tape with the interliner attached to the adhesive surface thereof may be unwound from said roll.

3. A roll of pressure-sensitive adhesive tape in accordance with claim 1 wherein the force necessary to separate the interliner from the adhesive surface of said tape is less than the force necessary to separate the interliner from the backside of said tape of an adjacent convolution in unwinding the tape from said roll, whereby the tape with the interliner attached to the backside of the tape may be unwound from said roll.

4. A roll of pressure-sensitive adhesive tape in which adjacent convolutions of said tape are separated from each other by an interliner, said tape having a nappy back surface and a pressure-sensitive adhesive front surface, said interliner having a back surface in contact with and separably adhered to said adhesive front surface of said tape, the opposite surface of said interliner having an adhesive thereon adhesively engaging the nap at the back surface of said tape, the adherence between the adhesive of the interliner and the nap being less than the adherence of said adhesive front surface of the tape to the nappy back surface of the tape of an adjacent convolution if wound in roll form without said interliner, said adhesive engagement between the interliner adhesive and said nap restraining the tape convolutions from lateral movement with respect to each other to thereby prevent telescoping collapse of the roll and accidental unwinding of the tape therefrom, but insufficient to impair said nap upon separation of the interliner therefrom.

5. A roll of pressure-sensitive adhesive tape in accordance with claim 4 wherein the force necessary to separate the adhesive of the interliner from the adhesive surface of said tape is greater than the force necessary to separate the interliner from the backside of said tape in unwinding the tape from said roll, whereby the tape with the interliner attached to the adhesive surface thereof may be unwound from said roll.

6. A roll of pressure-sensitive adhesive tape in accordance with claim 4 wherein the force necessary to separate the adhesive of the interliner from the adhesive surface of said tape is less than the force necessary to separate the interliner from the backside of said tape is unwinding the tape from said roll, whereby the tape with the interliner attached to the backside of the tape may be unwound from said roll.

7. A roll of tape in accordance with claim 4 wherein said tape is a flannel tape and the adhesive on said opposite surface of the interliner is a pressure-sensitive adhesive coating about 1 mil thick.

8. A roll of tape in accordance with claim 4, said tape having a width no greater than about one-half of an inch.

9. A roll of tape in accordance with claim 4 wherein said tape is a felt tape and the adhesive on said opposite surface of the interliner is a pressure-sensitive adhesive coating about 1 mil thick adhesively engaging the nap of said felt tape at the outermost ends of the fibrous constituents thereof.

10. A roll of tape in accordance with claim 9, said tape having a width no greater than about one-half of an inch.

11. A roll of pressure-sensitive adhesive tape in which the convolutions of said tape are separated from each other by an interliner, said tape having a backside and on the side opposite thereto a pressure-sensitive adhesive front surface, said interliner having a back surface in contact with and separably adhered to the adhesive surface of said tape, the opposite surface of said interliner in temporary positive engagement with the backside of said tape to restrain the tape convolutions from lateral movement with respect to each other and thereby prevent telescoping collapse of the roll and accidental unwinding of the tape therefrom.

12. A roll of tape in accordance with claim 11, said tape having a width no greater than about one-half of an inch.

References Cited

UNITED STATES PATENTS

| | | |
|---|---|---|
| 2,453,258 | 11/1948 | Pearson. |
| 2,599,359 | 6/1952 | Banks et al. _____ 161—406 X |
| 2,777,693 | 1/1957 | Mitchell. |
| 3,039,907 | 6/1962 | Scholl _____ 161—406 X |

FOREIGN PATENTS

| | | |
|---|---|---|
| 526,303 | 6/1956 | Canada. |

THERON E. CONDON, *Primary Examiner.*

J. M. CASKIE, *Assistant Examiner.*